USO10439871B2

(12) United States Patent
Thubert et al.

(10) Patent No.: US 10,439,871 B2
(45) Date of Patent: Oct. 8, 2019

(54) DETERMINISTIC STITCHING OF DETERMINISTIC SEGMENTS ACROSS DISTINCT DETERMINISTIC DOMAINS

(71) Applicant: Cisco Technology, Inc., San Jose, CA (US)

(72) Inventors: Pascal Thubert, La Colle sur Loup (FR); Patrick Wetterwald, Mouans Sartoux (FR); Rekha Ramachandran, Bangalore (IN); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 180 days.

(21) Appl. No.: 15/713,827

(22) Filed: Sep. 25, 2017

(65) Prior Publication Data

US 2019/0097884 A1  Mar. 28, 2019

(51) Int. Cl.
*H04W 24/08* (2009.01)
*H04L 12/24* (2006.01)
*H04L 12/26* (2006.01)

(52) U.S. Cl.
CPC ...... *H04L 41/0813* (2013.01); *H04L 41/0896* (2013.01); *H04L 43/0864* (2013.01);
(Continued)

(58) Field of Classification Search
CPC ......... H04L 41/04; H04L 47/24; H04L 47/10; H04L 47/80; H04L 47/20; H04L 47/72; H04J 3/0623; H04J 3/085; H04J 3/1641
(Continued)

(56) References Cited

U.S. PATENT DOCUMENTS 6,072,772 A   6/2000 Charny et al.
7,283,557 B2  10/2007 Cummings et al.
(Continued)

OTHER PUBLICATIONS

Korhonen, Ed., et al., "DetNet Data Plane Encapsulation", [online], Jun. 30, 2017, [retrieved on Aug. 25, 2017]. Retrieved from the Internet: URL: <https://tools.ietf.org/pdf/draft-dt-detnet-dp-sol-01.pdf>, pp. 1-30.

(Continued)

*Primary Examiner* — Mahran Y Abu Roumi
(74) *Attorney, Agent, or Firm* — Leon R. Turkevich

(57) ABSTRACT

In one embodiment, a method comprises: receiving, by a switching device, one or more identified flows of data packets from first deterministic flows of a first deterministic segment in a first deterministic domain, the first deterministic segment established based on first deterministic attributes in the first deterministic domain; receiving, by the switching device, second deterministic attributes about second deterministic flows for a second deterministic segment in a second different deterministic domain, the second deterministic attributes different than the first deterministic attributes; and allocating, by the switching device based on the first deterministic attributes and the second deterministic attributes, at least a portion of the second deterministic flows for deterministic stitching of the one or more identified flows of data packets from the first deterministic segment in the first deterministic domain into the second deterministic segment in the second deterministic domain according to a guaranteed deterministic constraint.

17 Claims, 10 Drawing Sheets

(52) U.S. Cl.
CPC ............ *H04L 43/16* (2013.01); *H04L 41/145* (2013.01); *H04L 43/087* (2013.01); *H04W 24/08* (2013.01)

(58) Field of Classification Search
USPC ........................................................ 709/223
See application file for complete search history.

(56) References Cited

U.S. PATENT DOCUMENTS

| | | | |
|---|---|---|---|
| 7,620,046 | B2 | 11/2009 | Ronciak et al. |
| 9,444,677 | B2 | 9/2016 | Kumar et al. |
| 2005/0117575 | A1 | 6/2005 | Konda |
| 2006/0140226 | A1 | 6/2006 | Ho et al. |
| 2017/0222920 | A1* | 8/2017 | Thubert ................. H04L 45/70 |
| 2017/0310594 | A1* | 10/2017 | Kotha .................. H04L 45/741 |

OTHER PUBLICATIONS

Finn et al., "Deterministic Networking Architecture", [online], Aug. 8, 2017, [retrieved on Sep. 15, 2017]. Retrieved from the Internet: URL: <https://tools.ietf.org/pdf/draft-ietf-detnet-architecture-03.pdf>, pp. 1-41.

Chen et al., "Use Cases and Requirements for using Track in 6TiSCH Networks", [online], Mar. 16, 2015, [retrieved on Aug. 25, 2017]. Retrieved from the Internet: URL: <https://tools.ietf.org/pdf/draft-wang-6tisch-track-use-cases-00.pdf>, pp. 1-9.

Cisco, "L2VPN Pseudowire Switching", [online], Feb. 19, 2007, [retrieved on Jun. 1, 2017]. Retrieved from the Internet: URL: <http://www.cisco.com/c/en/us/td/docs/ios/12_0s/feature/guide/fsstitch.pdf>, pp. 1-18.

Cisco, "MPLS Traffic Engineering: Inter-AS TE", [online], Jun. 29, 2007, [retrieved on Jun. 1, 2017]. Retrieved from he Internet: URL: <http://www.cisco.com/c/en/us/td/docs/ios/12_0s/feature/guide/gsintast.pdf>, pp. 1-30.

Berger et al., "Deterministic Networking (detnet)", [online], [retrieved on Aug. 16, 2017]. Retrieved from the Internet: URL: <https://datatracker.ietf.org/wg/detnet/about/>, pp. 1-4.

Chan et al., "Stitching Algorithm: A Network Performance Analysis Tool for Dynamic Mobile Networks", [online], Procedia Technology 2 (2012), [retrieved on Jun. 1, 2017]. Retrieved from the Internet: www.sciencedirect.com/science/article/pii/S2212017312002344#>, pp. 41-51.

Wikipedia, "Audio Video Bridging", [online], Mar. 5, 2017, [retrieved on Aug. 25, 2017]. Retrieved from the Internet: URL: <https://en.wikipedia.org/w/index.php?title=Audio_Video_Bridging&printable=yes>, pp. 1-11.

Wikipedia, "Time-Sensitive Networking", [online], Aug. 8, 2017, [retrieved on Aug. 25, 2017]. Retrieved from the Internet: URL: <https://en.wikipedia.org/w/index.php?title=Time-Sensitive_Networking&printable=yes>, pp. 1-7.

Wetterwald et al., U.S. Appl. No. 15/657,283, filed Jul. 24, 2017.

Thubert et al., U.S. Appl. No. 15/642,657, filed Jul. 6, 2017.

Handley et al., "Re-architecting datacenter networks and stacks for low latency and high performance", SIGCOMM 17, Los Angeles, California, Aug. 21-25, 2017, Association for Computing Machinery (ACM), pp. 29-42.

* cited by examiner

DETERMINISTIC STITCHING OF DETERMINISTIC SEGMENTS ACROSS DISTINCT DETERMINISTIC DOMAINS

TECHNICAL FIELD

The present disclosure generally relates to deterministic stitching of deterministic segments across distinct deterministic domains.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) Deterministic Networking (DetNet) Working Group is addressing proposals for satisfying the stringent requirements of deterministic networks (e.g., minimal jitter (i.e., packet delay variation), low latency, minimal packet loss, and high reliability). The DetNet Working Group is investigating proposals for networks that are under a single administrative control or within a closed group of administrative control, where such networks within the single/closed group of administrative control can provide forwarding along a multi-hop path with the deterministic properties of controlled latency, low packet low, low packet delay variation, and high reliability. One proposal for low power and lossy network (LLN) devices is a routing protocol that provides IPv6 routing using time slotted channel hopping (TSCH) based on IEEE 802.15.4e ("6TiSCH"), enabling wireless LLN devices to use low-power operation and channel hopping for higher reliability.

Deterministic transmission in wired networks can use time sensitive networking (TSN) and/or audio/video bridging (AVB) for deterministic networks such as professional and home audio/video, multimedia in transportation, vehicle engine control systems, and/or other general industrial and/or vehicular applications. Neither TSN nor AVB use time slots; rather, TSN uses time-based shapers that allocate time slices and guard bands to cause a data packet to be sent or received at a given intermediate node (i.e., hop) along a path at a prescribed precise time that is reserved exclusively for the given hop; AVB can use credit-based shapers that ensure bounded latency transmit/receive queues in each hop without congestion, thereby ensuring a bounded latency.

The IETF DetNet working group has stated that its work is focused on networks that are under a single administrative control or within a closed group of administrative control, and that it will not investigate solutions for large groups of domains such as the Internet. Hence, existing deterministic networking solutions assume deployment within a single deterministic domain that defines and manages deterministic segments using a prescribed set of deterministic attributes.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
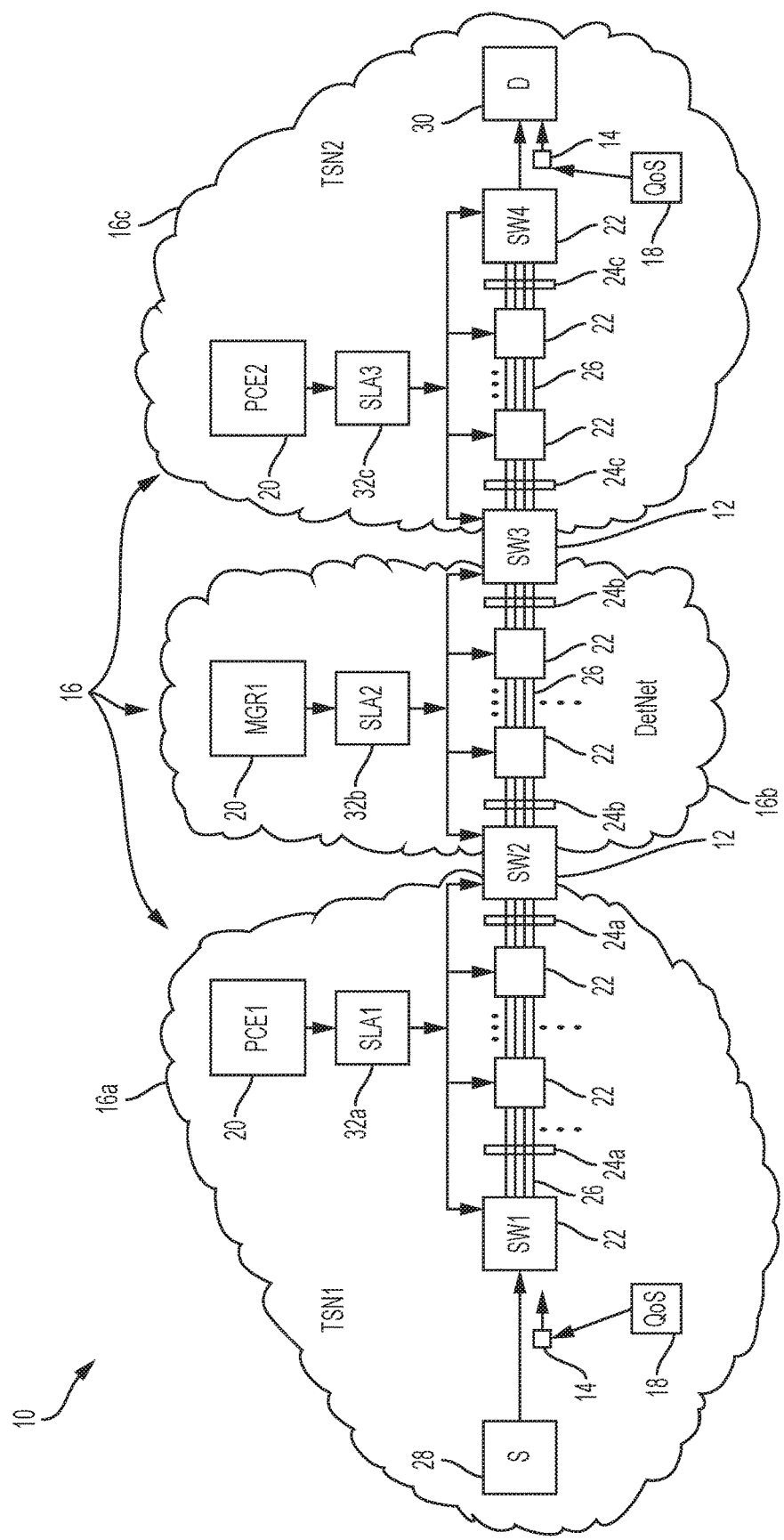
FIG. 1 illustrates an example deterministic system having an apparatus configured for executing deterministic stitching of deterministic segments across distinct deterministic domains, according to an example embodiment.

In one embodiment, a method comprises: receiving, by a switching device, one or more identified flows of data packets from first deterministic flows of a first deterministic segment in a first deterministic domain, the first deterministic segment established based on first deterministic attributes in the first deterministic domain; receiving, by the switching device, second deterministic attributes about second deterministic flows for a second deterministic segment in a second different deterministic domain, the second deterministic attributes different than the first deterministic attributes; and allocating, by the switching device based on the first deterministic attributes and the second deterministic attributes, at least a portion of the second deterministic flows for deterministic stitching of the one or more identified flows of data packets from the first deterministic segment in the first deterministic domain into the second deterministic segment in the second deterministic domain according to a guaranteed deterministic constraint.

In another embodiment, an apparatus comprises a processor circuit and a device interface circuit. The device interface circuit is configured receiving or more identified flows of data packets from first deterministic flows of a first deterministic segment in a first deterministic domain. The first deterministic segment is established based on first deterministic attributes in the first deterministic domain. The device interface circuit further is configured for receiving second deterministic attributes about second deterministic flows for a second deterministic segment in a second different deterministic domain, the second deterministic attributes different than the first deterministic attributes. The processor circuit is configured for allocating, based on the first deterministic attributes and the second deterministic attributes, at least a portion of the second deterministic flows for deterministic stitching of the one or more identified flows of data packets from the first deterministic segment in the first deterministic domain into the second deterministic segment in the second deterministic domain according to a guaranteed deterministic constraint.

In another embodiment, one or more non-transitory tangible media are encoded with logic for execution by a machine and when executed by the machine operable for: receiving, by the machine implemented as a switching device, receiving, by the machine implemented as a switching device, one or more identified flows of data packets from first deterministic flows of a first deterministic segment in a first deterministic domain, the first deterministic segment established based on first deterministic attributes in the first deterministic domain; receiving, by the switching device, second deterministic attributes about second deterministic flows for a second deterministic segment in a second different deterministic domain, the second deterministic attributes different than the first deterministic attributes; and allocating, by the switching device based on the first deterministic attributes and the second deterministic attributes, at least a portion of the second deterministic flows for deterministic stitching of the one or more identified flows of data packets from the first deterministic segment in the first deterministic domain into the second deterministic segment in the second deterministic domain according to a guaranteed deterministic constraint.

DETAILED DESCRIPTION

Particular embodiments enable deterministic end-to-end transmission and delivery of one or more identified flows of data packets (according to a guaranteed deterministic constraint) via multiple distinct and different deterministic domains that are established and maintained using different deterministic attributes and/or that are managed by different management entities providing respective administrative controls. The particular embodiments enable deterministic stitching of the identified flows of the data packets from a first deterministic segment in a first deterministic domain into a second deterministic segment for a second deterministic domain, where the deterministic stitching can be maintained according to the guaranteed deterministic constraint required by the identified flows of data packets.

Hence, the example embodiments enable the identified flows of data packets to be transported across different deterministic networks utilizing different deterministic attributes (e.g., different network layer technologies, different management domains, different deterministic schedules, etc.), while ensuring the deterministic constraints can be maintained. Consequently, the example embodiments enable end-to-end deterministic transport across multiple heterogeneous deterministic domains utilizing different network layer technologies and utilizing different management entities providing respective administrative controls.

FIG. 1 is a diagram illustrating an example system 10 having one or more inter-domain deterministic switching devices 12 configured for executing deterministic stitching of identified flows of data packets 14 between different deterministic domains 16 for delivery of the identified flows of data packets 14 according to a guaranteed deterministic constraint 18, according to an example embodiment. The apparatus 12 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation. Hence, the apparatus 12 is a machine implementing network communications within the network 10.

Each deterministic domain 16 is implemented as a data network (e.g., an Internet Protocol (IP)-based local area network (LAN) and/or Wide Area Network (WAN) such as the Internet) having a corresponding management entity 20 and one or more intra-domain deterministic switching devices 22. Each management entity 20 is configured for configuring each of the intra-domain deterministic switching devices 22 for establishing and maintaining one or more deterministic segments 24 comprising a plurality of deterministic flows 26 for deterministic transport of the identified flows of data packets 14. For example, the deterministic domain 16a can be implemented as a local area network (LAN) (e.g., a service provider access network, cloud-based data center, etc.) according any one of Time-Sensitive Network (TSN), AVB, 6TiSCH, etc., for deterministic transport of the identified flows of data packets 14 originating from a source network device 28 as an application flow of data packets requiring a guaranteed deterministic constraint 18. As illustrated in FIG. 1, the application flow of data packets (i.e., the identified flow of data packets 14) is delivered to an intra-domain deterministic ingress switching device "SW1" 22, that can split the application flow of data packets 14 into multiple deterministic flows (e.g., multiple TSN flows 26 providing respective synchronized bursts of data packets from the identified flows of data packets 14). For example, the application flow of data packets 14 may have a required data rate of 100 Megabits per second (Mb/s), however, each output switch port of the intra-domain deterministic ingress switching device "SW1" 22 can have an output bandwidth (i.e., link speed) of 10 Gigabits per second (Gb/s), hence, the deterministic flow 26 output by the intra-domain deterministic ingress switching device "SW1" 22 on a given output switch port can be a subset of the network traffic output on the 10 Gb/s output switch port.

The deterministic domain 16c can be implemented as a local area network (LAN) (e.g., a service provider access network) according any one of Time-Sensitive Network (TSN), AVB, 6TiSCH, etc., for deterministic delivery of the identified flow of data packets 14, as an application flow of data packets 14 according to the guaranteed deterministic constraint 18, to a destination network device 30. As illustrated in FIG. 1, the intra-domain deterministic egress switching device "SW4" 22 can receive the deterministic segment 24c comprising the deterministic flows 24c transporting various portions (e.g., bursts) of the identified flows of data packets 14, and reassemble and output the application flow of data packets 14 to the destination device 30 according to the guaranteed deterministic constraint.

In contrast, the deterministic domain 16b can have a different implementation (e.g., a local area network and/or wide area network) that uses DetNet pseudowires, for example, enabling transport of data packets over an Internet Protocol (IP) network and/or a Multi-Protocol Label Switched Traffic-Engineering (MPLS-TE) packet-switched network according to guaranteed Quality of Service (QoS) requirements.

Conventional implementations of deterministic networks assume that a deterministic network is implemented only within a single deterministic domain 16 that relies on a centralized management entity 20 (e.g., a Path Computation Element (PCE), network manager, etc.) for establishment, maintenance, and control of one or more deterministic segments 24 having one or more deterministic flows (e.g., TSN circuits or TSN paths, 6TiSCH tracks, AVB paths, etc.) 26 for end-to-end deterministic transport between a source network device and a destination network device within the same deterministic domain 16; in other words, the management entity "PGE1" 20 can only establish a deterministic segment 24a, according to an associated domain-specific service level agreement (SLA) 32a for the deterministic domain 16a, for deterministic transport within its deterministic domain 16a; the management entity "MGR1" 20 can only establish a deterministic segment 24b, according to an associated domain-specific SLA 32b for the deterministic domain 16*b*, for deterministic transport within its deterministic domain 16*b*; and the management entity "PGE2" 20 can only establish a deterministic segment 24*c*, according to an associated domain-specific SLA 32*c*, for deterministic transport within its deterministic domain 16*c*.

Hence, each management entity 20 is unable to establish a deterministic transport of an identified flow of data packets beyond its deterministic domain 16, because each deterministic domain 16 is implemented according to different deterministic attributes of the corresponding deterministic domain 16. Example deterministic attributes that are used to define the parameters for a deterministic segment 24 can include, for example: different periods for different cyclic schedules of deterministic flows within a deterministic segment, different flow types (e.g., TSN, 6TiSCH, AVB, MPLS-TE, etc.); different numbers of deterministic flows (circuits) within a deterministic segment; different bandwidth, throughput, and/or latency parameters for a given deterministic flow 26; different time and/or channel frequency transmission parameters for time-based deterministic transmissions (e.g., TSN timeslot parameters, 6TiSCH slot time and/or frequency channel parameters, etc.); different service level agreement parameters within the domain-specific SLA 32 used to establish a guaranteed deterministic constraint 18 within a given deterministic domain 16, etc. The guaranteed deterministic constraint 18 can be for a prescribed Quality of Service (QoS), expressed for example as a prescribed minimum bandwidth, an overall jitter below a prescribed maximum jitter variation, or a latency below a prescribed maximum latency.

According to example embodiments, each inter-domain deterministic switching device 12 is configured for receiving, from the management entities 20 of neighboring deterministic domains 16, deterministic attributes that describe the one or more deterministic flows 26 provided for one or more deterministic segments 24 for transport of identified flows of data packets 14 within the corresponding deterministic domain 16 according to a corresponding domain-specific SLA 32. For example, the inter-domain deterministic switching device "SW2" 12 can receive, from the "ingress" management entity "PGE1" 20, "first" deterministic attributes 32*a* that are used to establish the "first" deterministic segment 24*a* within the "first" deterministic domain 16*a* ("first" referring to the deterministic domain 16 supplying network traffic to the "ingress" links of the corresponding switching device); the inter-domain deterministic switching device "SW2" 12 also can receive, from the "egress" management entity "MGR1" 20, "second" deterministic attributes 32*b* about "second" deterministic flows 26 for a "second" deterministic segment 24*b* in the "second" deterministic domain 16*b* that is separate and distinct from the "first" deterministic domain 16*a* ("second" referring to the deterministic domain 16 receiving network traffic from the "egress" links of the corresponding switching device). Similarly, the inter-domain deterministic switching device "SW3" 12 can receive from the "ingress" network manager "MGR1" 20 "ingress" deterministic attributes 32*b* that are used to establish the "ingress" deterministic segment 24*b* within the "ingress" deterministic domain 16*b*, and the inter-domain deterministic switching device "SW3" 12 can receive from the "egress" network manager "PGE2" 20 "egress" deterministic attributes 32*c* about "egress" deterministic flows 26 for the "egress" deterministic segment 24*c* in the "egress" deterministic domain 16*c*.

Each inter-domain deterministic switching device (e.g., "SW2", "SW3") 12 is configured for allocating at least a portion of the "egress" deterministic flows 26 for deterministic stitching of the one or more identified flows of data packets 14 from the "ingress" deterministic segment 24 in the "ingress" deterministic domain 16 into the "egress" deterministic segment in the "egress" deterministic domain 16 according to the guaranteed deterministic constraint 18 established for the identified flows of data packets 14. Hence, the inter-domain deterministic switching device "SW2" 12 can execute deterministic stitching of the deterministic segment 24*a* to the deterministic segment 24*b* to ensure the deterministic transport of the identified flows of data packets 14 (from the deterministic domain 16*a* according to the domain-specific SLA 32*a* to the deterministic domain 16*b* according to the domain-specific SLA 32*b*) according to the guaranteed deterministic constraint 18; similarly, the inter-domain deterministic switching device "SW3" 12 can execute deterministic stitching of the deterministic segment 24*b* to the deterministic segment 24*c* to ensure the deterministic transport of the identified flows of data packets 14 (from the deterministic domain 16*b* according to the domain-specific SLA 32*b* to the deterministic domain 16*c* according to the domain-specific SLA 32*c*) according to the guaranteed deterministic constraint 18.

Hence, the example embodiments enable deterministic transport of identified flows of data packets 14 from a source network device (e.g., high-definition video server, cloud-based high-speed data server such as a cloud-based high definition television media server, videophone, etc.) 28 to a destination network device (e.g., high-definition video receiver or videophone) 30 across multiple heterogeneous deterministic networks that are managed according to distinct deterministic domains 16 by respective management entities 20 according to respective domain-specific SLAs 32, while ensuring the deterministic transport is executed according to the guaranteed deterministic constraint 18. As described below, each inter-domain deterministic switching device 12 can reconcile inconsistencies between deterministic segments 24 among the neighboring deterministic domains 16 to ensure the deterministic stitching (i.e., interconnections between different types of deterministic segments 24 while maintaining the guaranteed deterministic constraint 18) is maintained.

Figure 2:
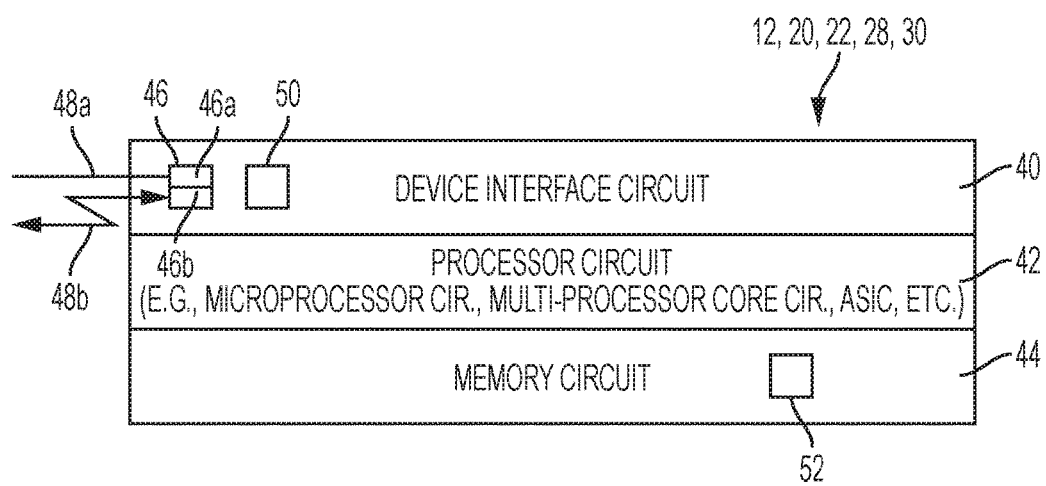
FIG. 2 illustrates an example implementation of the apparatus of FIG. 1, according to an example embodiment.

FIG. 2 illustrates an example implementation of any one of the devices 12, 20, 22, 28, and/or 30 of FIG. 1, according to an example embodiment.

Each apparatus 12, 20, 22, 28, and/or 30 can include a device interface circuit 40, a processor circuit 42, and a memory circuit 44. The device interface circuit 40 can include one or more distinct physical layer transceivers (e.g., an IEEE based Ethernet transceiver) 46 and a media access controller (MAC) 50 for data link layer operations. The one or more physical layer transceivers 46 can include a wired transceiver 46*a* providing a wired data link 48*a* (e.g., for TSN, AVB, and/or DetNet) and/or wireless transceiver 46*b* configured for providing a wireless data link 48*b* (e.g., for TSCH and/or 6TiSCH) for communication with any one of the other devices 12, 20, 22, 28, and/or 30; the device interface circuit 40 also can include a physical layer transceiver for communications with the devices of FIG. 1 via an optical link, etc. The processor circuit 42 can be configured for executing any of the operations described herein, and the memory circuit 44 can be configured for storing any data or data packets as described herein, for example within a data structure 52.

Any of the disclosed circuits of the devices 12, 20, 22, 28, and/or 30 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
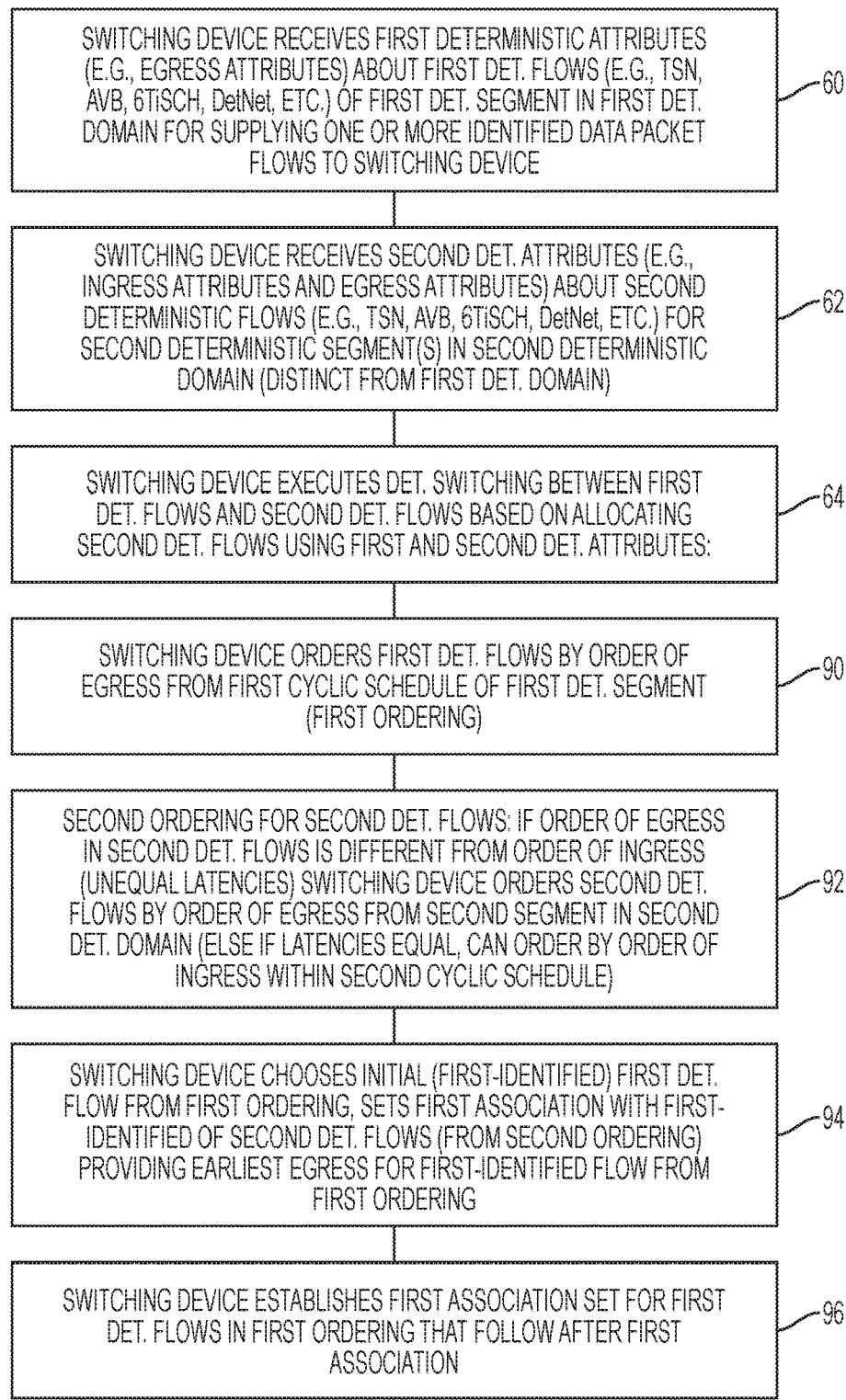
FIGS. 3A-3B summarize an example method, by the apparatus of FIGS. 1 and 2, of stitching deterministic segments across different distinct deterministic domains, according to an example embodiment.
Figure 3B:
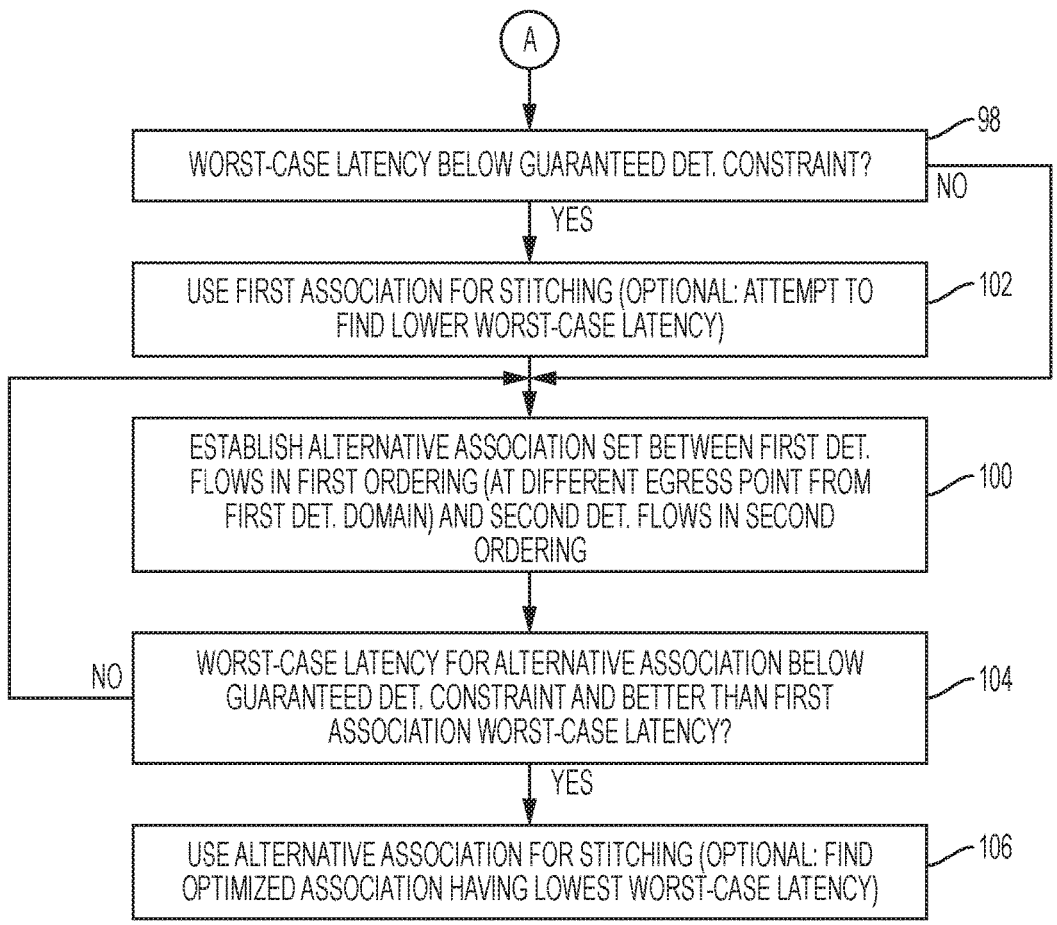
Figure 4A:
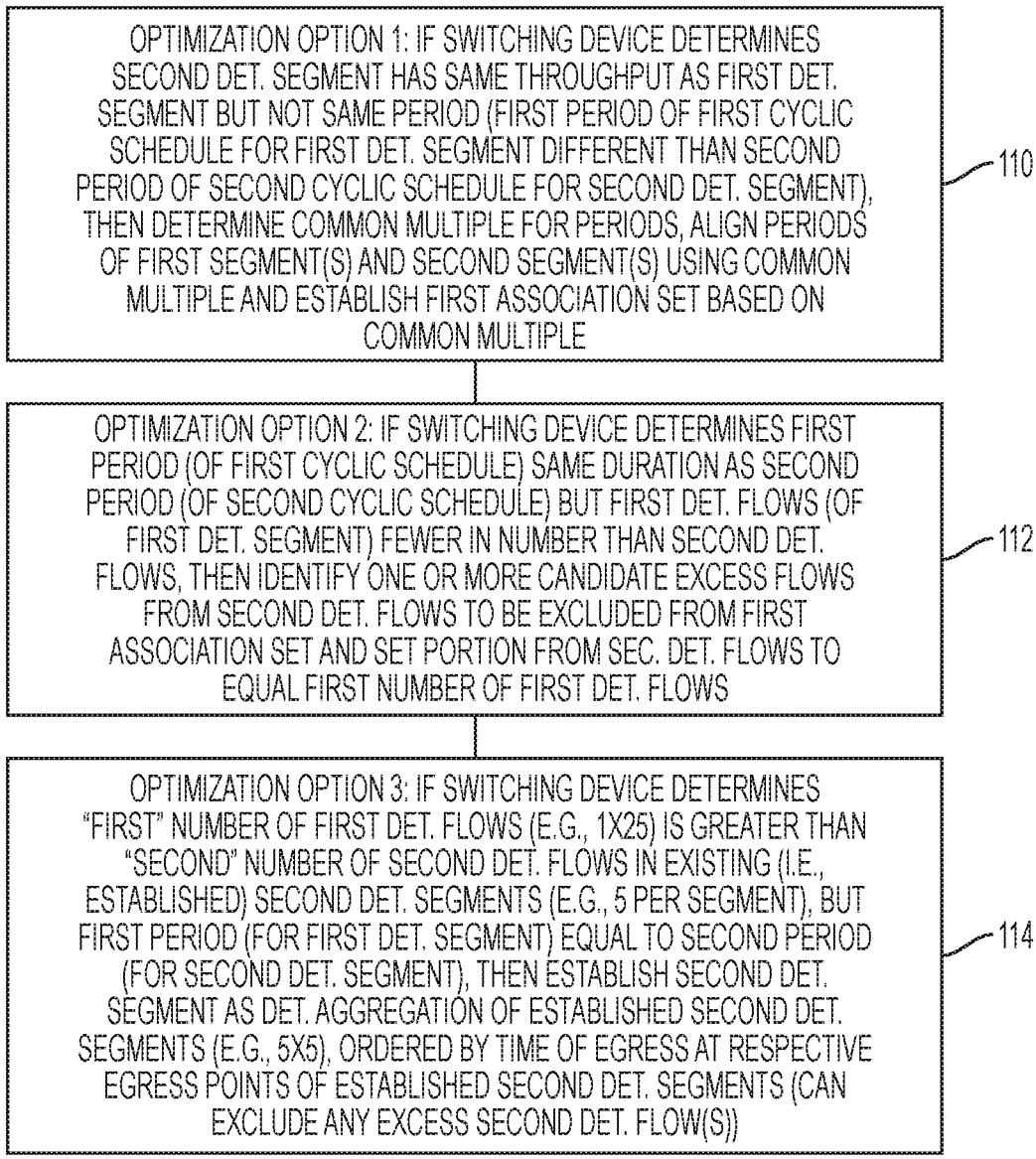
FIGS. 4A-4B illustrate example optimizations to the deterministic stitching of deterministic segments across distinct deterministic domains, according to an example embodiment.
Figure 4B:
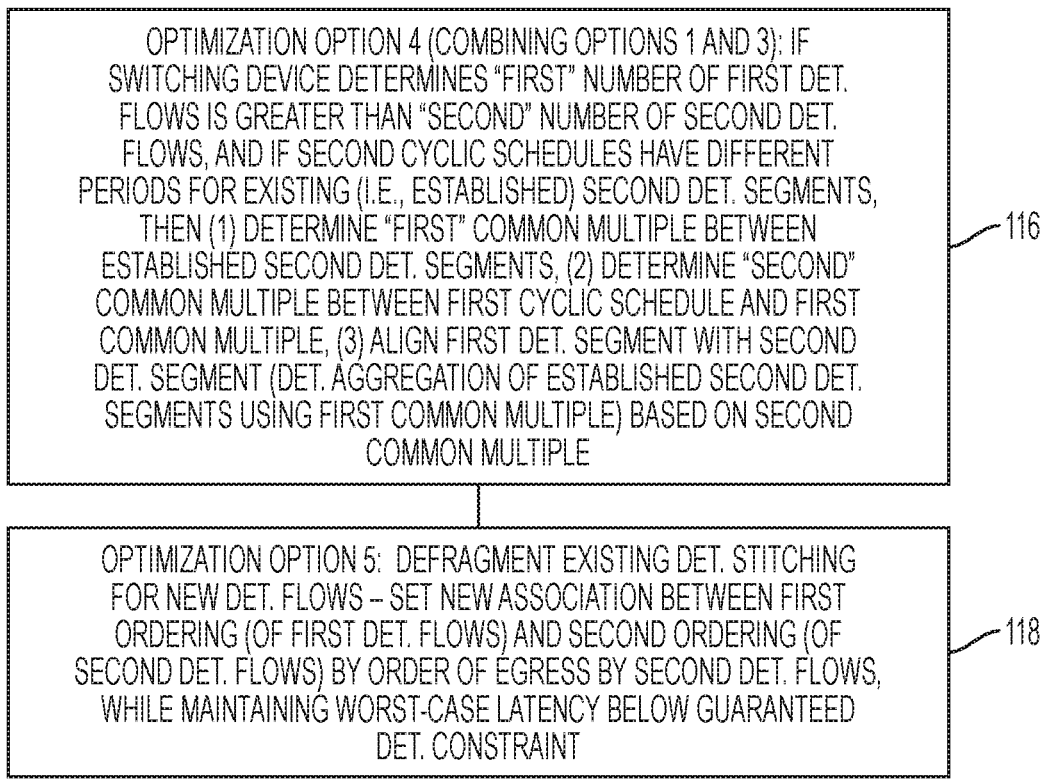

FIGS. 3A-3B summarize an example method, by the apparatus 12, of stitching deterministic segments across distinct deterministic domains, according to an example embodiment. FIGS. 4A-4B illustrate example optimizations by the apparatus 12 to the deterministic stitching of deterministic segments across distinct deterministic domains, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, each of the inter-domain deterministic switching devices 12 are configured for deterministically stitching identified flows of data packets 14 supplied by a deterministic segment 24 of a neighboring deterministic domain 16 (i.e., an "ingress" deterministic domain) to an available deterministic segment 24 of another different deterministic domain 16 providing reachability toward a destination network device 30 (i.e., an "egress" deterministic domain), based on deterministic attributes 32 obtained by each inter-domain deterministic switching device 12 from its corresponding neighboring deterministic domain 16. The following description will describe in detail the operations by the inter-domain deterministic switching device "SW2" 12a providing deterministic stitching between the deterministic domain "TSN1" 16a and the deterministic domain "DetNet" 16b, although the following description is applicable to the inter-domain deterministic switching device "SW3" 12 providing deterministic stitching between the deterministic domain "DetNet" 16b and the deterministic domain "TSN2" 16c.

The device interface circuit 40 of the inter-domain deterministic switching device "SW2" 12 in operation 60 is configured for receiving, from the "ingress" management entity "PGE1" 20 of the deterministic domain 16a, first deterministic attributes 32a (e.g., egress attributes) that describe the deterministic flows 26 that are used to establish the "first" deterministic segment 24a within the "first" deterministic domain 16a; in other words, the "egress" attributes describe the deterministic attributes and/or parameters that are used to establish one or more deterministic segments 24a for the identified flows of data packets 14 that egress from the deterministic segment 24a of the deterministic domain 16a to the inter-domain deterministic switching device "SW2" 12. As described previously, egress attributes can describe any one of: periods duration for a specific cyclic schedule of deterministic flows within a deterministic segment; flow type (e.g., TSN, 6TiSCH, AVB, MPLS-TE, etc.); number of deterministic flows (circuits) within an identified deterministic segment; bandwidth, throughput, and/or latency parameters for a given deterministic flow 26; time and/or channel frequency transmission parameters for time-based deterministic transmissions (e.g., TSN timeslot parameters, 6TiSCH slot time and/or frequency channel parameters, etc.); service level agreement parameters within the domain-specific SLA "SLA1" 32a that define the minimum guaranteed deterministic constraint within the deterministic domain 16a, etc.

Hence, the inter-domain deterministic switching device "SW2" 12 in operation 60 can receive the "first" deterministic attributes 32a that define the parameters of the deterministic flows 26 of the deterministic domain 16a that deterministically supply the identified flows of data packets 14 according to the guaranteed deterministic constraint 18.

The device interface circuit 40 of the inter-domain deterministic switching device "SW2" 12 in operation 62 also is configured for receiving, from the "egress" management entity "MGR1" 20 of the deterministic domain 16b, "second" deterministic attributes 32b about "second" deterministic flows 26 for a "second" deterministic segment 24b in the "second" deterministic domain 16 that is separate and distinct from the "first" deterministic domain 16. As described previously, one or more of the "second" deterministic attributes 32b from the deterministic domain 16b can be distinct and different from the "first" deterministic attributes 32a of the deterministic domain 16a, for example due to different schedules, type of network (e.g., TSN vs. DetNet), bandwidth or latency capabilities, etc. Further, the second deterministic attributes 32b can include both ingress attributes and egress attributes about each of the second deterministic flows 26 associated with at least one deterministic segment 24b, since the second deterministic flows 26 associated with a deterministic segment 24b in the deterministic domain 16b may have unequal latency; hence, any unequal latencies between second deterministic flows 26 can effectively cause a reordering in the "delivery" (i.e., egress) of packets from the deterministic segment 24b at the "egress" end terminated by the inter-domain deterministic switching device "SW3" 12.

Consequently, the inter-domain deterministic switching device "SW2" 12 in operation 62 can receive the "second" deterministic attributes 32b that describe the deterministic properties of both ends of the deterministic flows 26 associated with each deterministic segment 24b, including the "ingress" end of the deterministic segment 24b that receives the identified flows of data packets 14 from the inter-domain deterministic switching device "SW2" 12, and the "egress" end of the deterministic segment 24b that outputs the identified flows of data packets 14 to the next inter-domain deterministic switching device (e.g., "SW3" 12) (or the destination device 30, as appropriate). The reception of the deterministic attributes 32b about both the ingress end and the egress end of the deterministic segment 24b enables the inter-domain deterministic switching device "SW2" 12 to determine the appropriate ordering for inserting the data packets into the deterministic flows 26 associated with the deterministic segment 24b to maintain the guaranteed deterministic constraints, including transport below a required latency.

The processor circuit 42 of the inter-domain deterministic switching device "SW2" 12 in operation 64 is configured for executing deterministic stitching between the deterministic flows 26 of the deterministic segment 24a (supplying the identified flows of data packets 14 from the deterministic domain 16a) and the deterministic flows 26 of one or more of the deterministic segments 24b (from the deterministic domain 16b that is to receive the identified flows of data packets 14), based on allocating at least a portion of the second deterministic flows 26 from the deterministic domain 16b for the identified flows of data packets 14 based on the first deterministic attributes 32a (describing the first deterministic flows 26 of the first deterministic segment 24a) and second deterministic attributes 32b (describing the second deterministic flows 26 for one or more of the deterministic segments 24b). As described in further detail below, the processor circuit 42 of the inter-domain deterministic switching device "SW2" 12 can attempt different candidate association sets between the deterministic flows 26 of the domains 16a and 16b to identify whether a worst-case latency from the candidate association set is less than the guaranteed deterministic constraint required by the guaranteed deterministic constraint 18.

Figure 5A:
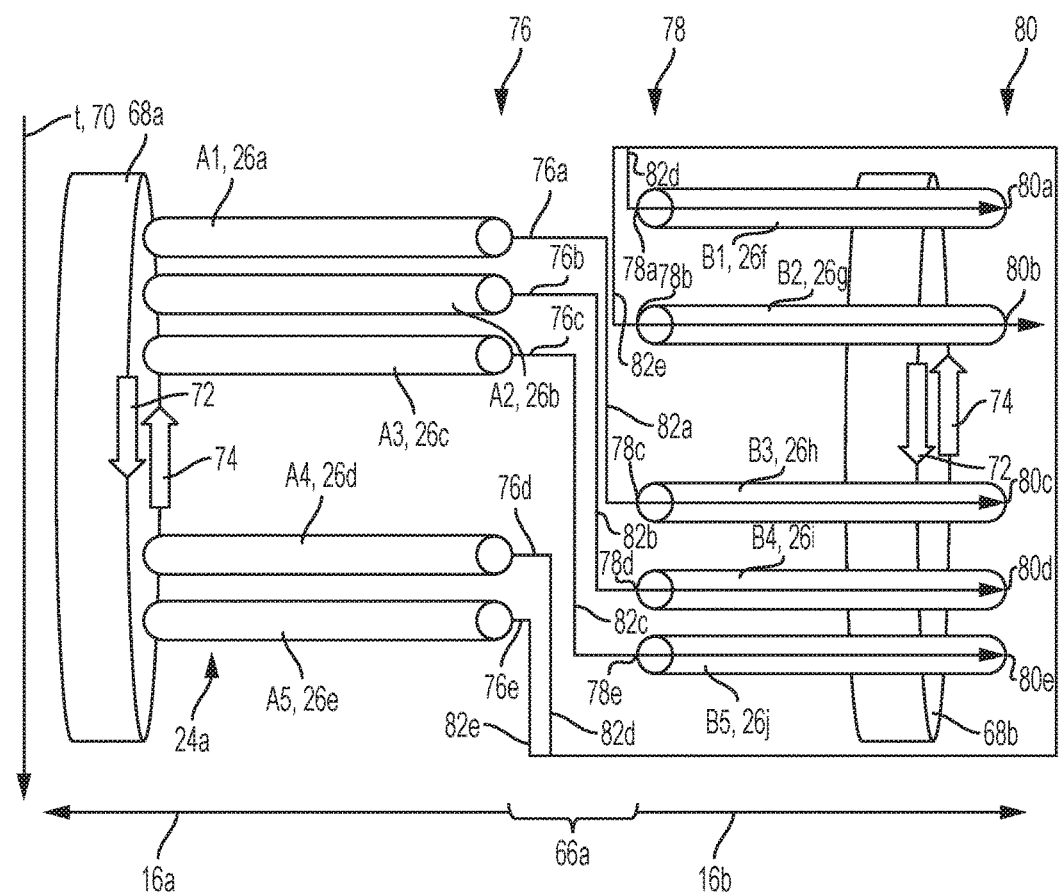
FIGS. 5A-5D illustrate examples of the deterministic stitching between first deterministic flows in a first of the deterministic domains and second deterministic flows in a second different deterministic domain that is distinct from the first deterministic domain, according to an example embodiment.

FIG. 5A illustrates an example stitching operation 66 (e.g., 66a), by the inter-domain deterministic switching device "SW2" 12, between the deterministic domain 16a and the deterministic domain 16b, according to an example embodiment. As illustrated in FIG. 5A, the deterministic segment 24a of the deterministic domain 16a comprises the deterministic flows "A1" 26a, "A2" 26b, "A3" 26c, "A4" 26d, and "A5" 26e, each configured for transmitting a selected number of the identified flows of data packets 14 (e.g., a burst of data packets) according to a first cyclic (i.e., repeating) schedule 68a established by the corresponding management entity "PCE1" 20 of the deterministic domain 16a according to the guaranteed deterministic constraint 18. In particular, the first cyclic schedule 68a provides a time-based sequence of the deterministic flows 26a-26e relative to the time axis 70, where time increases linearly in the downward direction 72 of the cyclic schedule 68a, where the downward arrow 72 represents the increasing sequence in time of the deterministic flows 26 for the corresponding cyclic schedule 68, and where the upward arrow 74 represents the repeating of the corresponding cyclic schedule 68. In particular, each deterministic flow 26 is implemented based on exclusive reservation of a link layer resource (e.g., TSN timeslot, AVB queue credits, 6TiSCH cell, etc.) at a particular instance (e.g., a particular instance in time), for deterministic transmission of at least a portion (e.g., a burst) of the identified flows of data packets 14 at the particular instance according to the cyclic schedule 68; hence, non-deterministic data can be transmitted during un-reserved intervals of the link layer resource. Consequently, a given link layer resource (e.g., a high-speed data link) may have a first time interval type and a second time interval type for data transmissions, the first time interval type used for exclusive reservation for a corresponding deterministic flow, and the second time interval type identifying un-reserved non-deterministic data transmission.

Hence, the cyclic schedule 68a established by the management entity "PCE1" 20 causes one or more of the intra-domain deterministic switching devices 22 of the deterministic domain 16a to deterministically output selected numbers (e.g., bursts) of the identified flows of data packets 14 from the deterministic segment 24a in the deterministic domain 16a at an identified egress instance 76 representing the instance that the penultimate intra-domain deterministic switching device transmits the selected numbers (e.g., burst) of data packets at the "deterministic burst" to the inter-domain deterministic switching device "SW2" 12 at the link speed (e.g., 10 Gb/s), for example as a TSN transmit timeslot, a 6TiSCH timeslot, a contention-free transmit opportunity, an AVB burst, etc. Hence, each deterministic flow 26 can also be considered a deterministic burst of data packets from the identified flow of data packets 14.

As illustrated in FIG. 5A, the cyclic schedule 68 provides the following schedule: the deterministic flow "A1" 26a outputs a selected number of the identified flows of data packets 14 at an egress instance 76a; the deterministic flow "A2" 26b outputs a selected number of the identified flows of data packets 14 at an egress instance 76b; the deterministic flow "A3" 26c outputs a selected number of the identified flows of data packets 14 at an egress instance 76c; the deterministic flow "A4" 26d outputs a selected number of the identified flows of data packets 14 at an egress instance 76*d;* and the deterministic flow "A5" 26*e* outputs a selected number of the identified flows of data packets 14 at an egress instance 76*e;* following the egress instance 76*e,* the cyclic schedule 68*a* is repeated as indicated by the upward arrow 74.

Similarly, as illustrated in FIG. 5A the management entity "MGR1" 20 of the deterministic domain 16*b* causes one or more of the intra-domain deterministic switching devices 22 of the deterministic domain 16 to establish second deterministic flows "B1" 26*f,* "B2" 26*g,* "B3" 26*h,* "B4" 26*i,* and "B5" 26*j* according to a second cyclic schedule 68*b.* Hence, the second cyclic schedule 68*b* created by the management entity "MGR1" 20 enables a data packet to deterministically enter the second deterministic flow "B1" 26*f* at an ingress instance 78*a* and deterministically exit from the deterministic domain 16*b* at the egress instance 80*a;* the second cyclic schedule 68*b* also enables a data packet to deterministically enter the second deterministic flow "B2" 26*g* at an ingress instance 78*b* and deterministically exit from the deterministic domain 16*b* at the egress instance 80*b;* the second cyclic schedule 68*b* also enables a data packet to deterministically enter the second deterministic flow "B3" 26*h* at an ingress instance 78*c* and deterministically exit from the deterministic domain 16*b* at the egress instance 80*c;* the second cyclic schedule 68*b* also enables a data packet to deterministically enter the second deterministic flow "B4" 26*i* at an ingress instance 78*d* and deterministically exit from the deterministic domain 16*b* at the egress instance 80*d;* and the second cyclic schedule 68*b* also enables a data packet to deterministically enter the second deterministic flow "B5" 26*j* at an ingress instance 78*e* and deterministically exit from the deterministic domain 16*b* at the egress instance 80*e.*

As described previously, the deterministic flows 26*a* through 26*e* can be deployed in the deterministic domain 16*a* using first deterministic attributes 32*a* established by the management entity "PGE1" 20, whereas the deterministic flows 26*f* through 26*j* are deployed in the deterministic domain 16*b* using different second deterministic attributes 32*b* established by the management entity "MGR1" 20. Hence, the processor circuit 42 of the inter-domain deterministic switching device "SW2" 12 in operation 66*a* can stitch together deterministic flows 26*a* through 26*e* to at least a portion of the deterministic flows 26*f* through 26*j* to execute deterministic stitching according to the guaranteed deterministic constraint 18.

For example, the processor circuit 42 of the inter-domain deterministic switching device "SW2" 12 in operation 90 of FIG. 3A orders the first deterministic flows 26*a*-26*e* by order of egress 76 from the first deterministic domain 16*a* (e.g., 76*a*-76*b*-76*c*-76*d*-76*e*), relative to the first cyclic schedule 68*a,* into a first ordering (e.g., A1-A2-A3-A4-A5) that starts with a first-identified first deterministic flow; for example, the first ordering in FIG. 5A starts with the "first-identified" first deterministic flow "A1" 26*a.* The order by egress 76 ensures the identified flows of data packets 14 are ordered by time of egress 76 from the deterministic domain 16*a.*

The processor circuit 42 of the inter-domain deterministic switching device "SW2" 12 in operation 92 performs a second ordering the second deterministic flows (e.g., 26*f* through 26*j*) of the deterministic domain 16*b,* relative to the second cyclic schedule 68*b,* that provides an earliest egress 80 from the deterministic domain 16*b.* As described previously, the processor circuit 42 performs the second ordering by order of the egress 80 from the second deterministic domain 16*b* (based on a determined difference in latency between the second deterministic flows), ensuring the deterministic constraints 18 are guaranteed even if the relative latencies between the second deterministic flows (e.g., 26*f* through 26*j*) from ingress 78 to egress 80 are unequal; if however, all of the relative latencies between the second deterministic flows (e.g., 26*f* through 26*j*) from ingress 78 to egress 80 are guaranteed by the network manager "MRG1" 20 to be identical, then the processor circuit 42 of the inter-domain deterministic switching device "SW2" 12 can use the order of ingress 78 for the second ordering without concern of introducing any reordering of the identified flows of data packets 14 during transport within the deterministic domain 16*b.*

The processor circuit 42 of the inter-domain deterministic switching device "SW2" 12 in operation 92 can generate a second ordering (e.g., B3-B4-B5-B1-B2) of the second deterministic flows 26*f*-26*j* by order of egress 80 from the second deterministic domain 16*b,* relative to the second cyclic schedule 68*b,* that starts in FIG. 5A with a "first-identified" second deterministic flow "B3" 26*h.* As described below, however, this second ordering (e.g., B3-B4-B5-B1-B2) does not provide the earliest egress 80 from the second deterministic domain 16 for the data packets from the "first-identified" first deterministic flow "A1" 26*a,* and from among the stitched latencies 82 can result in a worst-case latency (84*a* of FIG. 5B) that exceeds the guaranteed deterministic constraint 18.

The processor circuit 42 of the inter-domain deterministic switching device "SW2" 12 in the stitching operation 66*a* in operation 94 can choose an initial (first-identified) first deterministic flow "A1" 26*a* from the first ordering of the first deterministic flows 76*a*-76*e,* and a "first-identified" second deterministic flow "B3" 26*h* from the second ordering of second deterministic flows 26*f* through 26*j,* and set a first association "A1-B3" therebetween; the processor circuit 42 of the inter-domain deterministic switching device 12 in operation 96 can establish a first association set, based on the first association "A1-B3", that includes in the stitching operation 66*a* the first association "A1-B3" and the subsequent associations "A2-B4", "A3-B5", "A4-B1", and "A5-B2". The order by egress 76 ensures the identified flows of data packets 14 are ordered by time of egress 76 from the deterministic domain 16*a.*

Hence, the first association set established by the stitching operation 66*a* results in the first association "A1-B3" having a stitched latency (e.g., 43 microseconds (μs)) 82*a* representing a difference between the egress instances 80*c* and 76*a;* further, the association "A2-B4" has a stitched latency (e.g., 47 μs) 82*b* between the egress instances 80*d* and 76*b;* the association "A3-B5" has a stitched latency (e.g., 48 μs) 82*c* between the egress instances 80*e* and 76*c;* the association "A4-B1" has a stitched latency (e.g., 37 μs) 82*d* between the egress instances 80*a* and 76*d;* and the association "A5-B2" has a stitched latency (e.g., 45 μs) 82*e* between the egress instances 80*b* and 76*e.*

Figure 5B:
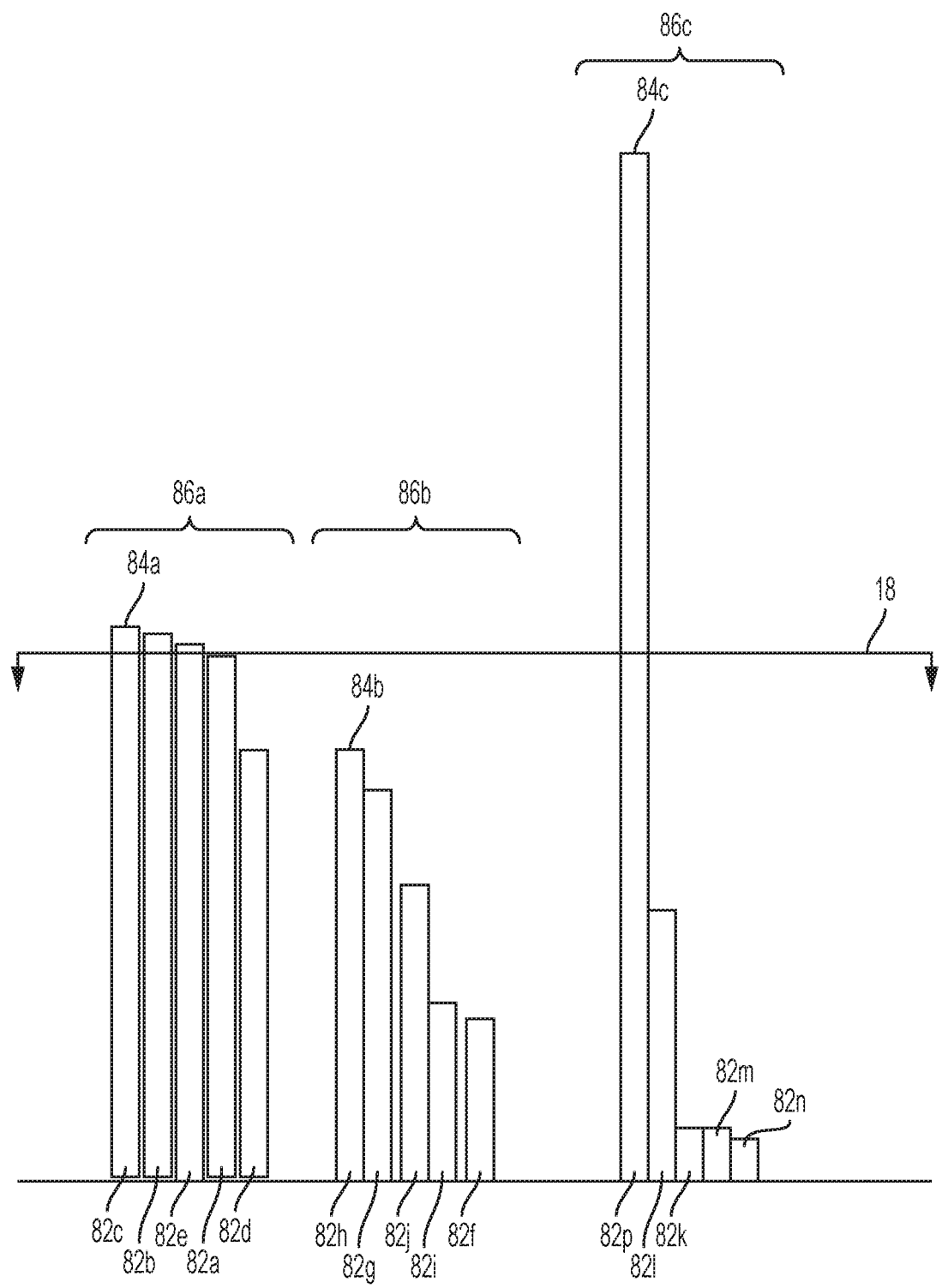

Hence, the first association set established by the stitching operation 66*a* results in the latency distribution 86*a* of FIG. 5B. As illustrated in FIG. 5B, the processor circuit 42 of the inter-domain deterministic switching device "SW2" 12 can determine in operation 98 of FIG. 3B that the latency distribution 86*a* includes a worst-case latency 84*a* of the stitched latency 82*c* (from the association "A3-B5"), the stitched latency 82*b,* and the stitched latency 82*e* each of which exceed the guaranteed deterministic constraint 18 (e.g. 44 μs latency across a single switch, or a total of 88 μs latency between the inter-domain deterministic switching devices "SW2" and "SW3"). Hence, referring to FIG. 3B, the processor circuit 42 of the inter-domain deterministic switching device "SW2" 12 can determine in operation 100 that an alternate association set is required between the first deterministic flows 26a-26e within a first ordering and the second deterministic flows 26f-26j in a second ordering. As illustrated in FIG. 3B, if the processor circuit 42 of the inter-domain deterministic switching device 12 determines in operation 104 that the first association is below the guaranteed deterministic constraint 18, the first association can be used in operation 106 for the deterministic stitching; alternately, additional permutations of the associations (via different permutations of stitching operations 66) can be established to determine a lower worst-case latency.

Figure 5C:
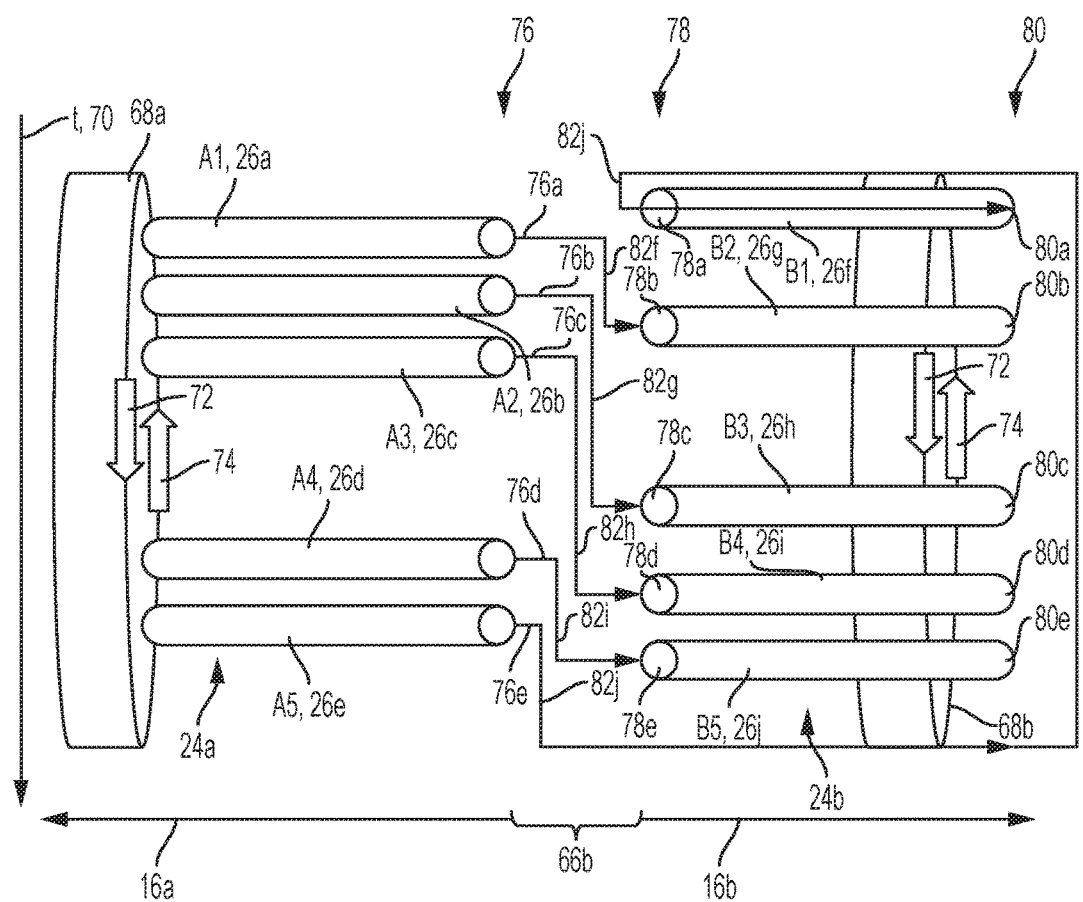

As illustrated with respect to FIGS. 5B and 5C, the example embodiments can establish a second deterministic stitching 66b that ensures a worst-case latency 84b is less than the guaranteed deterministic constraint 18, based on establishing an alternate association that starts with a second association between a second-identified first deterministic flow (e.g., "A1" 26a) and a second-identified second deterministic flow that provides the earliest corresponding egress instance 80 from the second deterministic domain 16b for the identified flows of data packets 14 from the second-identified first deterministic flow. As illustrated in FIG. 5C, the same deterministic flows 26a-26e are provided by the deterministic domain 16a and 26f-26j by the deterministic domain 16b. In contrast to the stitching operation 66a of FIG. 5A, however, processor circuit 42 of the inter-domain deterministic switching device "SW2" 12 in operation 100 of FIG. 3B can establish an alternate (second) association set, where the stitching operation 66b of FIG. 5B provides a deterministic stitching (i.e., the worst-case latency 84b of FIG. 5B is below the guaranteed deterministic constraint 18), based on the second-identified first deterministic flow (e.g., "A1" 26a) being associated with a second-identified of the second deterministic flows (e.g., B2" 26g) that provides the earliest egress 80b from the second deterministic domain 16b for the data packets from the second-identified first deterministic flow (e.g., "A1" 26a), resulting in the second association "A1-B2" having a corresponding stitched latency (e.g., 15 μs) 82f between the egress instances 80b and 76a. If desired, the first ordering in the alternate association set can be at a different egress point from the first deterministic domain 16a (e.g., using deterministic flow 26b instead of deterministic flow 26a).

Hence, the stitching operation 66b in FIG. 5C executed by the processor circuit 42 of the inter-domain deterministic switching device "SW2" 12 in operation 94 of FIG. 3A results in the second association set that includes the second association "A1-B2". The stitching operation 66b executed by the processor circuit 42 of the inter-domain deterministic switching device "SW2" 12 in operation 96 also establishes the second association set that further includes, following the second association "A1-B2", the association "A2-B3" having a corresponding stitched latency (e.g., 34 μs) 82g between the egress instances 80c and 76b, the association "A3-B4" having a corresponding stitched latency (e.g., 38 μs) 82h between the egress instances 80d and 76c, the association "A4-B5" having a corresponding stitched latency (e.g., 16 μs) 82i between the egress instances 80e and 76d, and the association "A5-B1" having a corresponding stitched latency (e.g., 26 μs) 82j between the egress instances 80a and 76e.

As illustrated in FIG. 5B, the processor circuit 42 of the inter-domain deterministic switching device "SW2" 12 in operation 102 can determine that the second association set established by the stitching operation 66b of FIG. 5C results in the latency distribution 86b that includes the worst-case latency 84b (corresponding to the stitched latency 82h) below the guaranteed deterministic constraint 18. Hence, the processor circuit 42 of the inter-domain deterministic switching device "SW2" 12 in operation 104 of FIG. 3B can allocate in the stitching operation 66b the second deterministic flows 26f-26j for deterministic stitching of the identified flows of data packets 14 from the deterministic segment 24a (comprising the first ordering of the deterministic flows 26a-26e) to a second deterministic segment 24b (comprising the second deterministic flows 26f-26j in the second ordering 26g-26h-26i-26j-26f) in the second deterministic domain 16b, according to the guaranteed deterministic constraint 18. Hence, the processor circuit 42 of the inter-domain deterministic switching device 12 can recursively generate different permutations of stitching operations 66 to identify one or more latency distributions 86 that are below the guaranteed deterministic constraint 18; if desired, the inter-domain deterministic switching device 12 can identify, from the different permutations of stitching operations 66, the combination that provides the lowest worst-case latency 84 for minimal latency in traversing the inter-domain deterministic switching device "SW2" 12.

As apparent from the foregoing, the example embodiments can guarantee that all deterministic flows are within the guaranteed deterministic constraint 18, and can ensure no deterministic flow is mapped to another deterministic flow that would exceed the guaranteed deterministic constraint 18. For example, one example permutation of a stitching operation 66 could result in the latency distribution 86c of FIG. 5B, where the association "A2-B2" has a corresponding stitched latency (e.g., 5 μs) 82k between the egress instances 80b and 76b, the association "A3-B3" has a corresponding stitched latency (e.g., 24 μs) 82l between the egress instances 80c and 76c, the association "A4-B4" has a corresponding stitched latency (e.g., 5 μs) 82m between the egress instances 80d and 76d, the association "A5-B5" has a corresponding stitched latency (e.g., 4 μs) 82n between the egress instances 80e and 76e, but the association "A1-B1" has a corresponding stitched latency (e.g., 89 μs) 82p between the egress instances 80a and 76a (i.e., the inter-domain deterministic switching device "SW2" 12 needs to buffer received data packets from the deterministic flow "A1" 26a for an entire cycle of the cyclic schedule 68b before insertion into the deterministic flow "B1" 260. Hence, the foregoing description of the example embodiments guarantees that the association "A2-B2", "A3-B3", "A4-B4", "A5-B5", "A1-B1" would not be used, despite the relatively low latencies 82k through 82n, since the worst-case latency 84c provided by the stitched latency 82p would exceed the guaranteed deterministic constraint 18.

According to example embodiments, each inter-domain deterministic switching device 12 can provide deterministic switching between different deterministic domains 16 having different distinct attributes established by different distinct management entities 20, while ensuring the identified flows of data packets 14 are deterministically stitched from a first deterministic segment 24a in a first deterministic domain 16a into a second deterministic segment 24b in a second deterministic domain 16b, according to the guaranteed deterministic constraint 18. Since the different deterministic domains 16 may use different numbers of deterministic segments 24 for a given deterministic segment 24, different periods for the cyclic schedules 68, and/or different numbers of deterministic segments 24 for transporting the identified flows of data packets 14, the following description provides various optimization options for different "problem" scenarios encountered in execution of the deterministic stitching.

FIG. 4A illustrates various optimization options that can be executed by the processor circuit 42 of the inter-domain deterministic switching device "SW2" 12 and/or the inter-domain deterministic switching device "SW3" 12, depending on the differences encountered in the deterministic flows 26 of the neighboring deterministic domains 16. For example, operation 110 illustrates a first optimization option ("option 1") that can be executed by the inter-domain deterministic switching device "SW2" 12 if the processor circuit 42 of the inter-domain deterministic switching device "SW2" 12 determines that second deterministic segment (e.g., 24b) in the second deterministic domain 16b has the same throughput as the first deterministic segment 24a of the first deterministic domain 16, but that the period of the deterministic segment 24b is not the same as the corresponding period of the deterministic segment 24a. For example, assume that the deterministic segment 24a comprises a cyclic schedule 68a having a period of six (6) seconds and sixty (60) deterministic flows 26 (implemented, for example as deterministic TSN timeslots each having a duration of 100 μs), whereas the deterministic segment 24b comprises a cyclic schedule 68b having a period of four (4) seconds and forty (40) deterministic flows 26 (implemented, for example as deterministic TSN timeslots each having a duration of 100 μs).

Hence, the processor circuit 42 of the inter-domain deterministic switching device "SW2" 12 in operation 110 can determine that the first cyclic schedule 68a in the first deterministic domain 16a has a first period that is different than the corresponding second period of the second cyclic schedule 68b used by the second deterministic flows 26 of the second deterministic segment 24b in the second deterministic domain 16b, and in response determine in operation 110 a common multiple between the first cyclic schedule 68a and the second cyclic schedule 68b. For example, the processor circuit 42 can determine a smallest common multiple of twelve (12) seconds between the six-second period of the cyclic schedule 68a and the four-second period of the cyclic schedule 68b; hence, the processor circuit 42 of the inter-domain deterministic switching device 12 in operation 110 can establish the first association set based on the common multiple between the six-second period of the cyclic schedule 68a and the four-second period of the cyclic schedule 68b, by mapping in the stitching operation 66 two (2) cycles of the six-second cyclic schedule 68a to three (3) cycles of the four-second cyclic schedule 68b.

Operation 112 of the processor circuit 42 of the inter-domain deterministic switching device 12 illustrates a second optimization option (option 2), where the processor circuit 42 of the inter-domain deterministic switching device 12 determines that the first cyclic schedule cyclic schedule 68a in the first deterministic domain deterministic domain 16a has a first period that is same as a corresponding second period of the second cyclic schedule 68b used by the second deterministic flows 26 of the second deterministic segment 24b in the second deterministic domain 16b, but that the deterministic segment 24a has a number (N1) of deterministic flows 26 that is less (e.g., less time slots) than the number (N2) of deterministic flows 26 in the deterministic segment 24b (N2>N1). In other words, the processor circuit 42 of the inter-domain deterministic switching device "SW2" 12 can determine the deterministic segment 24a comprises a first number (N1) of the first deterministic flows 26 that is less than a corresponding second number (N2) of the second deterministic flows 26 in the deterministic segment 24b. In response, the processor circuit 42 of the inter-domain deterministic switching device "SW2" 12 in operation 112 can establish the first association set based on identifying one or more candidate excess flows (N3=N2-N1) from the second deterministic flows (in the deterministic segment 24b) to be excluded from the first association set, and setting the portion of the second deterministic flows (N2-N3) to equal the first number (N1) of the first deterministic flows.

Hence, the excess N3 deterministic flows 26 in the deterministic segment 24b can be excluded by the processor circuit 42 of the inter-domain deterministic switching device "SW2" 12 in operation 112 from the first association set to enabling the stitching operation 66 with the N1 deterministic flows 26 in the deterministic segment 24a, and the processor circuit 42 of the inter-domain deterministic switching device "SW2" 12 in operation 112 can compare the worst-case latency 84 for the reduced set of second deterministic flows to the guaranteed deterministic constraint 18, as described above with respect to the operations in FIG. 3B. As described previously, different permutations of stitching operations 66 can be tested to identify a reduced set of second deterministic flows (minus the excess N3 deterministic flows) that provide a corresponding latency distribution 86 below the guaranteed deterministic constraint 18. In some examples, certain consecutive deterministic segments 24 in the deterministic segment 24b (without an intervening deterministic flow 26 in the deterministic segment 24) could be excluded based on the determined absence of any intervening deterministic flow 26 in the deterministic segment 24 that could utilize the consecutive deterministic segments 24; in other examples, if the above-described requirements are executed, namely of starting the ordering of the second deterministic flows by order of egress from the second deterministic domain, based on a determined difference in latency between the second deterministic flows, and identifying the first-identified of the second deterministic flows that provides an earliest egress from the second deterministic domain 16b for the data packets from the first-identified first deterministic flow from the first deterministic domain 16a, then certain consecutive deterministic segments 24 in the deterministic segment 24b could be excluded.

Operation 114 illustrates a third optimization option (option 3), where the processor circuit 42 of the inter-domain deterministic switching device "SW2" 12 can identify established (e.g., pre-existing) second deterministic segments (e.g., "S1", "S2", . . . "S5") 24 in the second deterministic domain 16b based on the second deterministic attributes 32b supplied by the management entity "MGR1" 20, where each of the established second deterministic segments (e.g., "S1", "S2" . . . "S5") comprises a second number (N5) of the second deterministic flows. In this example, the processor circuit 42 of the inter-domain deterministic switching device "SW2" 12 can determine (based on the first deterministic attributes 32a supplied by the management entity "PGE1" 20) that the deterministic segment 24a comprises a first number (N4) of the first deterministic flows that is greater (e.g., N4=25) than the second number (e.g., N5=5) of second deterministic flows in any of the established second deterministic segments of the second deterministic domain 16b (N4>N5). In this example, the processor circuit 42 of the inter-domain deterministic switching device "SW2" 12 can determine in operation 114 that the established second deterministic segments (e.g., "S1", "S2" . . . "S5") have the same period for their respective cyclic schedules 68. In this example, the processor circuit 42 of the inter-domain deterministic switching device "SW2" 12 also can determine in operation 114 that the first deterministic segment 24a has the same throughput as the aggregate throughput of the established second deterministic segments (e.g., "S1", "S2" . . . "S5").

Hence, the processor circuit 42 of the inter-domain deterministic switching device "SW2" 12 in operation 114 can establish the second deterministic segment 24b as a deterministic aggregation of the established second deterministic segments "S1", "S2", "S3", "S4", and "S5". The processor circuit 42 of the inter-domain deterministic switching device "SW2" 12 in operation 114 can establish the second deterministic segment 24b based on ordering the established second deterministic segments "S1", "S2", "S3", "S4", and "S5" relative to order of egress at the respective egress points 80. The processor circuit 42 of the inter-domain deterministic switching device "SW2" 12 also can determine in operation 114 whether the worst-case latency 84 in the corresponding latency distribution 86 is less than the guaranteed deterministic constraint 18 as described previously with respect to FIG. 3B, or whether another permutation of the stitching operation 66 is required.

Figure 5D:
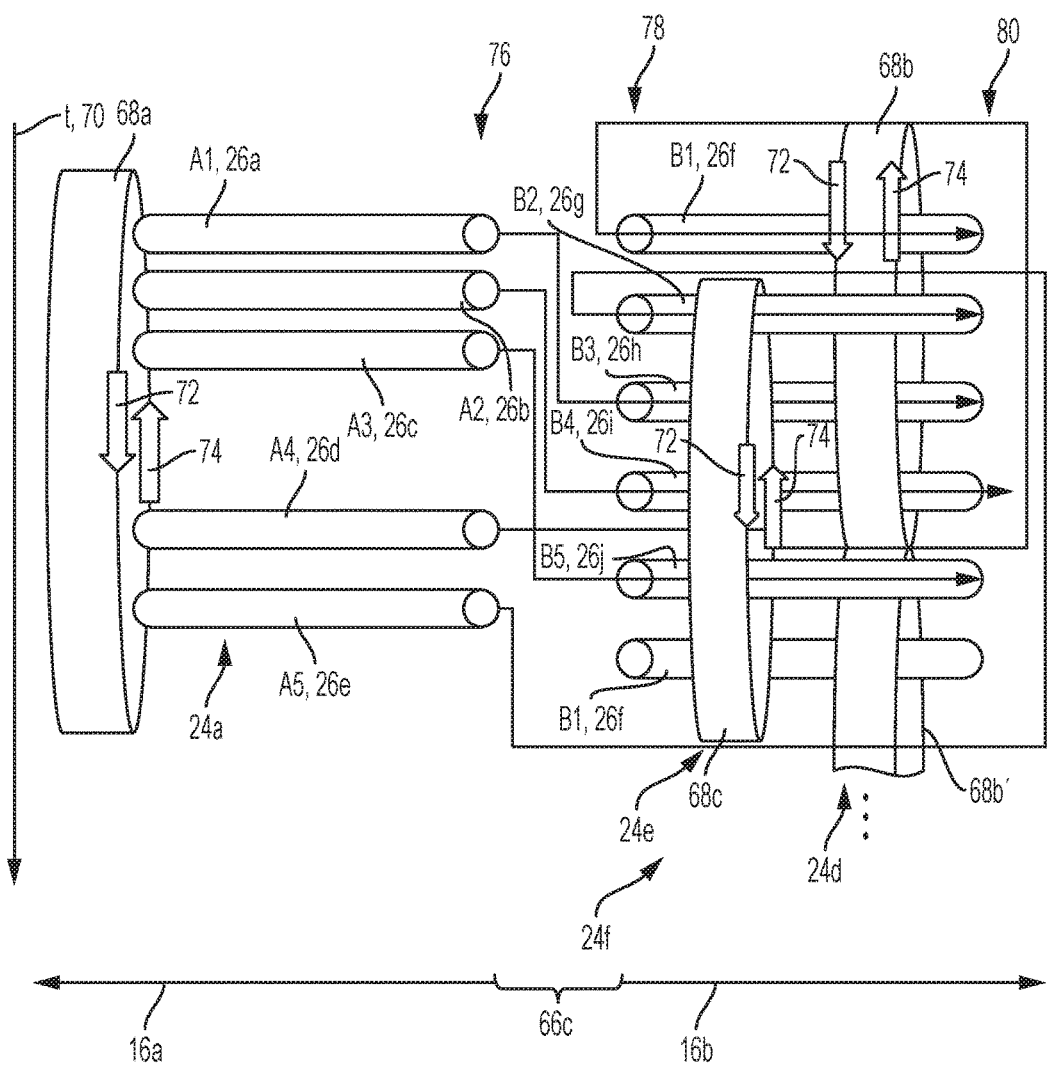

Operation 116 illustrates a fourth optimization option (option 4) that is illustrated with respect to FIG. 5D and that utilizes a combination of the optimizations options "option 1" and "option 3" described with respect to operations 110 and 114, respectively, for execution of the deterministic stitching operation 66c. In particular, the processor circuit 42 of the inter-domain deterministic switching device "SW2" 12 can determine that the second deterministic domain 16b has established second deterministic segments 24d and 24e that have different periods for the respective second cyclic schedules 68b and 68c for the respective associated second deterministic flows. For example, the cyclic schedules 68a, 68b, and 68c can represent distinct schedules for different TSN segments; hence, the example embodiments enable the stitching of data packets (according to the stitching operation 66c) in a manner that distributes a burst of the data packets; in other words, the example embodiments enable stitching "m" TSN flows (from the deterministic domain 16a) into "n" TSN flows in the deterministic domain 16b.

As illustrated in FIG. 5D, the processor circuit 42 of the inter-domain deterministic switching device "SW2" 12 in operation 116 can determine that the established second deterministic segment 24d includes the deterministic flows "B1" 26f, "B3" 26h and "B4" 26i operating according to the second cyclic schedule 68b having an example period "P2" of 300 µs (e.g., "P2=300 µs") (a repeat instance of which is illustrated as 68b'), and the established second deterministic segment 24e includes the deterministic flows "B2" 26g and "B5" operating according to the second cyclic schedule 68c having an example period "P3" of 200 µs (e.g. "P3=200 µs"). The processor circuit 42 of the inter-domain deterministic switching device "SW2" 12 in operation 116 also can determine that each of the deterministic segments 24d and 24e have less deterministic segments 24 than the number of deterministic segments 24 in the deterministic segment 24a operating according to the first cyclic schedule 68a having an example period "P1" of 900 µs (e.g., "P1=900 µs").

As described with respect to operation 110, the processor circuit 42 of the inter-domain deterministic switching device "SW2" 12 in operation 116 can determine a first common multiple (e.g., M1=600 µs) between the established second deterministic segments having different periods P2 and P3. Hence, the processor circuit 42 of the inter-domain deterministic switching device "SW2" 12 in operation 116 can form a "virtualized" second deterministic segment 24f based on a deterministic aggregation of the established second deterministic segments 24d and 24e relative to the first common multiple "M1", such that two (2) instances of the deterministic segment 24d are aggregated with three (3) instances of the deterministic segment 24e to form the virtualized second deterministic segment 24f having the period equal to the first common multiple "M1=600 µs".

The processor circuit 42 of the inter-domain deterministic switching device "SW2" 12 in operation 116 also can determine a second common multiple (M2=1800 µs) between the first cyclic schedule 68a and the first common multiple (M1=600 µs) determined for the second deterministic segments 68b and 68c. The processor circuit 42 of the inter-domain deterministic switching device "SW2" 12 in operation 116 can align the first deterministic segment 24a and the second deterministic segment 24f to an aligned throughput based on the second common multiple "M2", based on deterministically stitching two instances of the deterministic segment 24a to three instances of the deterministic segment 24f. As described previously, the second deterministic segment 24f is established by the processor circuit 42 of the inter-domain deterministic switching device "SW2" 12 as the deterministic aggregation of the established second deterministic segments 24d and 24e relative to the first common multiple "M1". The processor circuit 42 of the inter-domain deterministic switching device "SW2" 12 can then determine whether the worst-case latency 84 in the latency distribution 86 is less than the guaranteed deterministic constraint 18 as described previously with respect to FIG. 3B, or whether another permutation of the stitching operation 66 is required.

The optimization "option 4" in operation 116 is particularly effective in merging multiple TSN flows (e.g., in the second deterministic domain 16b) with a relatively large deterministic segment 24a in the first deterministic domain 16a, for example in the case of a relatively large DetNet pseudowire configured for deterministic transport across a backhaul network (e.g., a wide area network such as the Internet). In particular, the multiple TSN flows (e.g., in the second deterministic domain 16b) can be merged together because they represent the same application flow.

Note that if the processor circuit 42 of the inter-domain deterministic switching device "SW2" 12 in operation 116 detects an excess number of deterministic flows 26 in the deterministic segment 24f relative to the number of deterministic flows 26 in the deterministic segment 24a, the processor circuit 42 of the inter-domain deterministic switching device "SW2" 12 can execute optimization option "3" as described with respect to operation 114, followed by optimization option "2" in operation 112, for deterministic stitching between the deterministic segment 24a and the deterministic segment 24f.

Operation 118 illustrates a fifth optimization option (option 5), where the processor circuit 42 of the inter-domain deterministic switching device "SW2" 12 can execute defragmenting of the deterministic stitching for new data flows. In particular, a deterministic link layer (L2) fabric interconnection (e.g., in the deterministic domain 16a) is interconnected over a deterministic WAN connection in the deterministic domain 16b (e.g., TSN in the deterministic domain 16a is interconnected with DetNet in the deterministic domain 16b), instances may arise where a number of small TSN flows from the deterministic domain 16a are stitched into a larger TSN transport in the deterministic domain 16b and then stitched back at the egress of the WAN of deterministic domain 16b, for stitching by the inter-domain deterministic switching device "SW3" 12 from the DetNet pseudowire in the deterministic domain 16*b* into a TSN transport in the deterministic domain 16*c*. The addition of new TSN flows in the deterministic domain 16*a* to the relatively large DetNet deterministic segment 24*b* is relatively straightforward, using the optimization option 4 in operation 116 as described above for the deterministic stitching by the inter-domain deterministic switching device "SW3" 12 at the egress of the DetNet deterministic segment 24*b*, in combination with ensuring with respect to FIG. 3B that the worst-case latency 84 of a given latency distribution 86 is less than the guaranteed deterministic constraint 18.

If, however, the DetNet deterministic segment 24*b* becomes substantially allocated by the inter-domain deterministic switching device "SW2" 12, the introduction of a new deterministic flow 26 by the deterministic domain 16*a* (e.g., TSN flow) may require the inter-domain deterministic switching device "SW2" 12 to re-allocate the deterministic flows 26 in the deterministic domain 16*b* in order to maintain the required deterministic latency for the new deterministic flow 26 from the deterministic domain 16*a*.

Hence, the processor circuit 42 of the inter-domain deterministic switching device "SW2" 12 in operation 118 can execute defragmenting of the deterministic stitching based on repeating the operations of 3A and 3B by setting a second association between the first ordering and a second ordering of the second deterministic flows by order of egress 80 from the second deterministic domain, while maintaining the corresponding worst-case latency 84 less than the guaranteed deterministic constraint 18.

As described previously, any one of the operations described herein also can be executed by the deterministic domain 16*b* for deterministic stitching from the deterministic domain 16*b* to the deterministic domain 16*c*, prior to final delivery by the deterministic domain 16*c* to the destination network device 30 according to the guaranteed deterministic constraint 18. Hence, the deterministic domain 16*b* can maintain the deterministic transport of the identified flows of data packets 14 toward the destination network device 30 according to the guaranteed deterministic constraint 18.

According to example embodiments, deterministic segments (either pre-existing, dynamically established, and/or permanent) within different deterministic domains can be interconnected while maintaining a guaranteed deterministic constraints, without the necessity of recalculating an entire deterministic path between a source network device and a destination network device. Hence, deterministic segments (e.g., that are permanently established) within a first (e.g., source) deterministic domain serving a deterministic source network device can be deterministically stitched (i.e., deterministically interconnected) with deterministic segments of other deterministic domains, for example a destination deterministic domain serving a deterministic destination network device, and/or a deterministic backhaul network offering traffic-engineered deterministic paths across a wide area network (WAN) between a source deterministic domain and a destination deterministic domain.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a switching device, one or more identified flows of data packets from first deterministic flows of a first deterministic segment in a first deterministic domain, the first deterministic segment established based on first deterministic attributes in the first deterministic domain;
receiving, by the switching device, second deterministic attributes about second deterministic flows for a second deterministic segment in a second different deterministic domain, the second deterministic attributes different than the first deterministic attributes; and
allocating, by the switching device based on the first deterministic attributes and the second deterministic attributes, at least a portion of the second deterministic flows for deterministic stitching of the one or more identified flows of data packets from the first deterministic segment in the first deterministic domain into the second deterministic segment in the second deterministic domain according to a guaranteed deterministic constraint, wherein the allocating comprises:
ordering the first deterministic flows, by order of egress from the first deterministic domain relative to a first cyclic schedule among the first deterministic flows, into a first ordering of the first deterministic flows that starts with a first-identified first deterministic flow;
setting a first association between the first-identified first deterministic flow and a first-identified of the second deterministic flows that provides an earliest egress from the second deterministic domain for the data packets from the first-identified first deterministic flow;
establishing a first association set, based on the first association, between the first deterministic flows and at least the portion of second deterministic flows; and
determining whether a worst-case latency, relative to the first association set, is less than the guaranteed deterministic constraint.

2. The method of claim 1, wherein the allocating further comprises:
establishing a second association set between the first deterministic flows and at least a same or different portion of the second deterministic flows, starting with a second association between a second-identified first deterministic flow and a second-identified second deterministic flow that provides the earliest corresponding egress from the second deterministic domain for the second-identified first deterministic flow; and
determining whether the corresponding worst-case latency for the second association set is less than the corresponding worst-case latency of the first association set.

3. The method of claim 1, wherein the allocating further comprises:
determining the first cyclic schedule in the first deterministic domain has a first period that is different than a corresponding second period of a second cyclic schedule used by the second deterministic flows of the second deterministic segment in the second deterministic domain;
determining a common multiple between the first cyclic schedule and the second cyclic schedule;
the establishing including establishing the first association set based on the common multiple between the first cyclic schedule and the second cyclic schedule.

4. The method of claim 1, wherein the allocating further comprises:
determining the first cyclic schedule in the first deterministic domain has a first period that is same as a corresponding second period of a second cyclic schedule used by the second deterministic flows of the second deterministic segment in the second deterministic domain;

determining a first number of the first deterministic flows is less than a corresponding second number of the second deterministic flows;

the establishing of the first association set including identifying one or more candidate excess flows from the second deterministic flows to be excluded from the first association set, and setting the portion of the second deterministic flows to equal the first number of the first deterministic flows.

5. The method of claim 1, wherein the allocating further comprises:

identifying established second deterministic segments in the second deterministic domain based on the second deterministic attributes, each of the established second deterministic segments comprising a second number of the second deterministic flows;

determining a first number of the first deterministic flows is greater than the second number of second deterministic flows in any of the established second deterministic segments;

establishing the second deterministic segment as a deterministic aggregation of the established second deterministic segments, the establishing including ordering the established second deterministic segments relative to order of egress at respective egress points.

6. The method of claim 5, wherein the allocating further comprises:

detecting that the established second deterministic segments have different periods for respective second cyclic schedules for the respective associated second deterministic flows;

determining a first common multiple between the established second deterministic segments having different periods;

determining a second common multiple between the first cyclic schedule and the first common multiple determined for the second deterministic segments; and aligning the first deterministic segment and the second deterministic segment to an aligned throughput based on the second common multiple, the second deterministic segment established as the deterministic aggregation of the second deterministic segments relative to the first common multiple.

7. The method of claim 1, further comprising defragmenting the deterministic stitching based on setting a second association between the first ordering and a second ordering of the second deterministic flows by order of egress from the second deterministic domain, while maintaining the corresponding worst-case latency less than the guaranteed deterministic constraint.

8. The method of claim 1, wherein the allocating further comprises:

ordering the second deterministic flows into a second ordering of the second deterministic flows by order of egress from the second deterministic domain, based on a determined difference in latency between the second deterministic flows; and identifying a first of the second deterministic flows in the second ordering as the first-identified of the second deterministic flows;

the first association set based on associating the first ordering of the first deterministic flows, relative to the egress from the first deterministic domain, with the second ordering of the second deterministic flows relative to the egress from the second deterministic domain.

9. An apparatus comprising:

a processor circuit; and a device interface circuit configured for receiving or more identified flows of data packets from first deterministic flows of a first deterministic segment in a first deterministic domain, the first deterministic segment established based on first deterministic attributes in the first deterministic domain;

the device interface circuit further configured for receiving second deterministic attributes about second deterministic flows for a second deterministic segment in a second different deterministic domain, the second deterministic attributes different than the first deterministic attributes;

the processor circuit configured for allocating, based on the first deterministic attributes and the second deterministic attributes, at least a portion of the second deterministic flows for deterministic stitching of the one or more identified flows of data packets from the first deterministic segment in the first deterministic domain into the second deterministic segment in the second deterministic domain according to a guaranteed deterministic constraint, wherein the processor circuit further is configured for:

ordering the first deterministic flows, by order of egress from the first deterministic domain relative to a first cyclic schedule among the first deterministic flows, into a first ordering of the first deterministic flows that starts with a first-identified first deterministic flow;

setting a first association between the first-identified first deterministic flow and a first-identified of the second deterministic flows that provides an earliest egress from the second deterministic domain for the data packets from the first-identified first deterministic flow;

establishing a first association set, based on the first association, between the first deterministic flows and at least the portion of second deterministic flows; and determining whether a worst-case latency, relative to the first association set, is less than the guaranteed deterministic constraint.

10. The apparatus of claim 9, wherein the processor circuit further is configured for:

establishing a second association set between the first deterministic flows and at least a same or different portion of the second deterministic flows, starting with a second association between a second-identified first deterministic flow and a second-identified second deterministic flow that provides the earliest corresponding egress from the second deterministic domain for the second-identified first deterministic flow; and determining whether the corresponding worst-case latency for the second association set is less than the corresponding worst-case latency of the first association set.

11. The apparatus of claim 9, wherein the processor circuit further is configured for:

determining the first cyclic schedule in the first deterministic domain has a first period that is different than a corresponding second period of a second cyclic schedule used by the second deterministic flows of the second deterministic segment in the second deterministic domain;

determining a common multiple between the first cyclic schedule and the second cyclic schedule;

establishing the first association set based on the common multiple between the first cyclic schedule and the second cyclic schedule.

12. The apparatus of claim 9, wherein the processor circuit further is configured for:
   determining the first cyclic schedule in the first deterministic domain has a first period that is same as a corresponding second period of a second cyclic schedule used by the second deterministic flows of the second deterministic segment in the second deterministic domain;
   determining a first number of the first deterministic flows is less than a corresponding second number of the second deterministic flows;
   identifying one or more candidate excess flows from the second deterministic flows to be excluded from the first association set, and setting the portion of the second deterministic flows to equal the first number of the first deterministic flows.

13. The apparatus of claim 9, wherein the processor circuit further is configured for:
   identifying established second deterministic segments in the second deterministic domain based on the second deterministic attributes, each of the established second deterministic segments comprising a second number of the second deterministic flows;
   determining a first number of the first deterministic flows is greater than the second number of second deterministic flows in any of the established second deterministic segments;
   establishing the second deterministic segment as a deterministic aggregation of the established second deterministic segments, including ordering the established second deterministic segments relative to order of egress at respective egress points.

14. The apparatus of claim 13, wherein the processor circuit further is configured for:
   detecting that the established second deterministic segments have different periods for respective second cyclic schedules for the respective associated second deterministic flows;
   determining a first common multiple between the established second deterministic segments having different periods;
   determining a second common multiple between the first cyclic schedule and the first common multiple determined for the second deterministic segments; and
   aligning the first deterministic segment and the second deterministic segment to an aligned throughput based on the second common multiple, the second deterministic segment established as the deterministic aggregation of the second deterministic segments relative to the first common multiple.

15. The apparatus of claim 9, the processor circuit further is configured for defragmenting the deterministic stitching based on setting a second association between the first ordering and a second ordering of the second deterministic flows by order of egress from the second deterministic domain, while maintaining the corresponding worst-case latency less than the guaranteed deterministic constraint.

16. The apparatus of claim 9, wherein the processor circuit further is configured for:
   ordering the second deterministic flows into a second ordering of the second deterministic flows by order of egress from the second deterministic domain, based on a determined difference in latency between the second deterministic flows; and
   identifying a first of the second deterministic flows in the second ordering as the first-identified of the second deterministic flows;
   the first association set based on associating the first ordering of the first deterministic flows, relative to the egress from the first deterministic domain, with the second ordering of the second deterministic flows relative to the egress from the second deterministic domain.

17. One or more non-transitory tangible media encoded with logic for execution by a machine and when executed by the machine operable for:
   receiving, by the machine implemented as a switching device, one or more identified flows of data packets from first deterministic flows of a first deterministic segment in a first deterministic domain, the first deterministic segment established based on first deterministic attributes in the first deterministic domain;
   receiving, by the switching device, second deterministic attributes about second deterministic flows for a second deterministic segment in a second different deterministic domain, the second deterministic attributes different than the first deterministic attributes; and
   allocating, by the switching device based on the first deterministic attributes and the second deterministic attributes, at least a portion of the second deterministic flows for deterministic stitching of the one or more identified flows of data packets from the first deterministic segment in the first deterministic domain into the second deterministic segment in the second deterministic domain according to a guaranteed deterministic constraint, wherein the allocating comprises:
   ordering the first deterministic flows, by order of egress from the first deterministic domain relative to a first cyclic schedule among the first deterministic flows, into a first ordering of the first deterministic flows that starts with a first-identified first deterministic flow;
   setting a first association between the first-identified first deterministic flow and a first-identified of the second deterministic flows that provides an earliest egress from the second deterministic domain for the data packets from the first-identified first deterministic flow;
   establishing a first association set, based on the first association, between the first deterministic flows and at least the portion of second deterministic flows; and
   determining whether a worst-case latency, relative to the first association set, is less than the guaranteed deterministic constraint.

* * * * *